(12) United States Patent  
Bala et al.

(10) Patent No.: US 8,103,096 B2
(45) Date of Patent: Jan. 24, 2012

(54) SYSTEM AND METHOD FOR COLOR SPACE CONVERSION WITH REDUCED ARTIFACTS

(75) Inventors: Raja Bala, Webster, NY (US); Michael Branciforte, Rochester, NY (US); Reiner Eschbach, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 817 days.

(21) Appl. No.: 12/201,069

(22) Filed: Aug. 29, 2008

(65) Prior Publication Data

US 2010/0054581 A1 Mar. 4, 2010

(51) Int. Cl.
*G06K 9/00* (2006.01)
*G09G 5/02* (2006.01)

(52) U.S. Cl. .......... 382/167; 382/162; 345/604

(58) Field of Classification Search .......... 382/162–167; 345/597, 604; 358/518, 520
See application file for complete search history.

(56) References Cited

U.S. PATENT DOCUMENTS

| | | | |
|---|---|---|---|
| 5,450,217 A * | 9/1995 | Eschbach et al. ............. 358/518 |
| 5,818,613 A * | 10/1998 | Masterson et al. ............ 358/520 |
| 6,414,690 B1 | 7/2002 | Balasubramanian et al. |
| 6,646,762 B1 | 11/2003 | Balasubramanian et al. |
| 6,668,077 B1 * | 12/2003 | Ohkubo ........................ 382/162 |
| 6,954,287 B1 | 10/2005 | Balasubramanian et al. |
| 2002/0181000 A1 * | 12/2002 | Fukasawa et al. ............. 358/1.9 |
| 2003/0071823 A1 * | 4/2003 | Fukasawa ...................... 345/589 |
| 2004/0061707 A1 * | 4/2004 | Yoshida ........................ 345/690 |
| 2005/0063587 A1 * | 3/2005 | Nishiwaki et al. ............ 382/166 |
| 2006/0176313 A1 * | 8/2006 | Xu et al. ....................... 345/603 |
| 2008/0226163 A1 * | 9/2008 | Levy et al. .................... 382/162 |

* cited by examiner

*Primary Examiner* — Samir Ahmed
*Assistant Examiner* — Li Liu
(74) *Attorney, Agent, or Firm* — Michael J. Nickerson; Basch & Nickerson LLP

(57) ABSTRACT

A method and system convert an original digital image being represented by a first color space to a digital image being represented by a second color space by transforming the original image data represented by a first color space to second image data being represented by a second color space, the transformation causing the colors of the transformed image data to be substantially encodable in the second color space. The second image data represented by the second color space is transformed to third image data represented by the first color space, the transformation causing the colors of the transformed image data to be substantially encodable in the first color space. Distortions in the third image data represented by the first color space are corrected to form corrected image data represented by the first color space, and the corrected image data represented by the first color space is transformed to fourth image data represented by the second color space.

22 Claims, 3 Drawing Sheets

SYSTEM AND METHOD FOR COLOR SPACE CONVERSION WITH REDUCED ARTIFACTS

BACKGROUND

During the processing of digital color images, many operations are performed in order to improve the quality of the final image. For example, the color gamut of a digital camera may include colors that are not reproducible on the destination printer. In these cases, as is well known in the art, there are a variety of ways to adjust such out of gamut colors to bring the out of gamut colors into the printer's gamut.

One conventional methodology to adjust such out of gamut colors to bring the out of gamut colors into the printer's gamut is to map each color to the closest color within the printer's gamut. Another methodology compensates for out of gamut colors by considering the pixels in a neighborhood of the image around an affected pixel and adjusting the out of gamut color accordingly.

Conventional methods seek to minimize artifacts, or equivalently, maximize image quality when converting between color definitions that are limited by physical device gamuts, such as those of an ink jet or xerographic printer. However, this is not the only case where artifacts can arise from color space transformations occur. Another case is the transformation between mathematical color spaces.

For example, it may be more convenient to perform certain color modifications to an image in a color space that represents each pixel as a luminance-like coordinate and two color (chrominance) coordinates than to process the image in a color space that represents each pixel in a device-dependent color representation such as RGB or CMYK.

Examples of color spaces that represent each pixel as a luminance-like coordinate and two color (chrominance) coordinates (luminance-chrominance color spaces) include YCbCr, L*a*b*, HVC, etc. Moreover, examples of device-dependent color spaces include RGB, CMY, CMYK, etc. It should be noted that all (RGB, etc.) color spaces are considered in the same way, even if the color spaces might have a colorimetric definition.

Since many images are conventionally created in device-dependent color spaces; which represent each pixel in e.g. RGB or CMYK color space; to perform certain color modifications, the originally generated image may need to be transformed to an alternative color space.

Implicit in the definition of a color space is the existence of a color gamut of the color space itself, independent of any particular physical device.

This color space gamut arises due to constraints imposed by the digital encoding of a given color space. For example, an 8-bit encoding of sRGB values is a mapping from the real interval [0, 1] to the discrete interval [0, 255] and represents a finite gamut of colors within the larger space of visually perceivable colors.

More importantly, different color spaces have different encoding gamuts. That is colors that are representable in one color space encoding may not be within the encoding of another color space. When a transformation is applied from one color space to another color space, colors outside of the gamut must somehow be mapped within the valid encoding of the output color space. Improper mapping can give rise to artifacts, in particular to loss of spatial detail.

Since the concept of a color gamut is commonly associated with the colors that are reproducible by a physical device like a camera or printer, it is not usual to think of the colors that are representable in a particular color space as a gamut. However, as explained above, color space transformations can give rise to some of the same artifacts that arise when transforming colors between devices.

Therefore, it would be desirable to transform from one color space to another color space that minimizes the loss of spatial detail due to gamut constraints of the color spaces involved.

BRIEF DESCRIPTION OF THE DRAWING

The drawings are only for purposes of illustrating various embodiments and are not to be construed as limiting, wherein.

DETAILED DESCRIPTION

Figure 1:
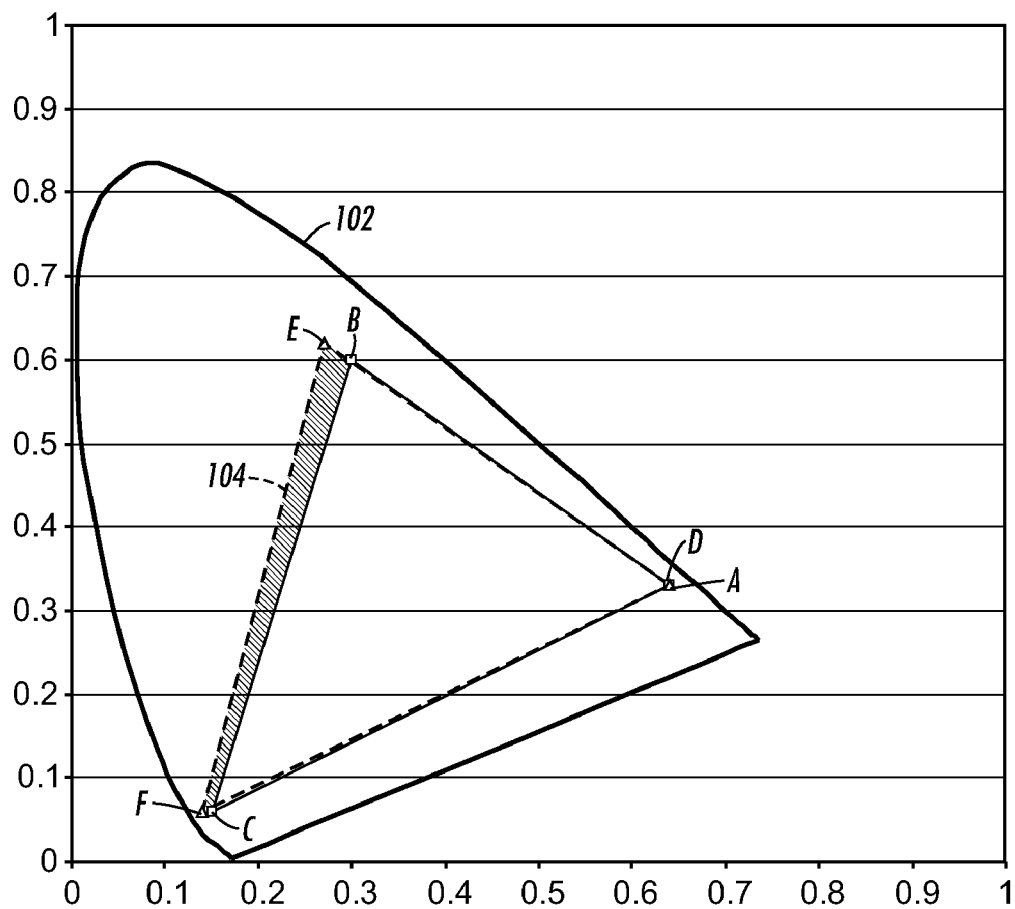
FIG. 1 illustrates two color spaces on a CIE chromaticity diagram showing the different implied gamuts of the two color spaces.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

Color images are often represented in a variety of color spaces, e.g. sRGB, CIELAB, YCrCb, etc. The reason is that different color spaces are advantageous in different applications and scenarios. There is thus often a need to transform images from one color space to another.

One issue to consider is the gamut constraint imposed by the digital encoding of a given color space. For example, an 8-bit encoding of sRGB values is a mapping from the real interval [0, 1] to the discrete interval [0, 255] and represents a finite gamut of colors within the larger space of visually perceivable colors.

As noted above, different color spaces have different gamuts. When a transformation is applied from one color space to another color space, colors outside of the gamut of the destination space are typically clipped to the valid encoding range of the destination space. This can result in undesirable artifacts in images, namely loss of spatial detail.

To better illustrate this point, FIG. 1 shows two color spaces on a CIE chromaticity diagram. The spectral locus is given by curve 102. Points ABC represent the chromaticity coordinates of the sRGB primaries. All colors that can be represented in the sRGB space are within the triangle formed by points ABC.

For comparison, the primaries for a second color space are illustrated in FIG. 1, as points DEF. Again, all colors that can be represented in the second color space are within the triangle DEF.

FIG. 1 illustrates that there are colors in one space that cannot be represented in the other. For example, the shaded area 104 represents colors that can be represented in the second color space (DEF), but not in the first color space ABC.

Figure 2:
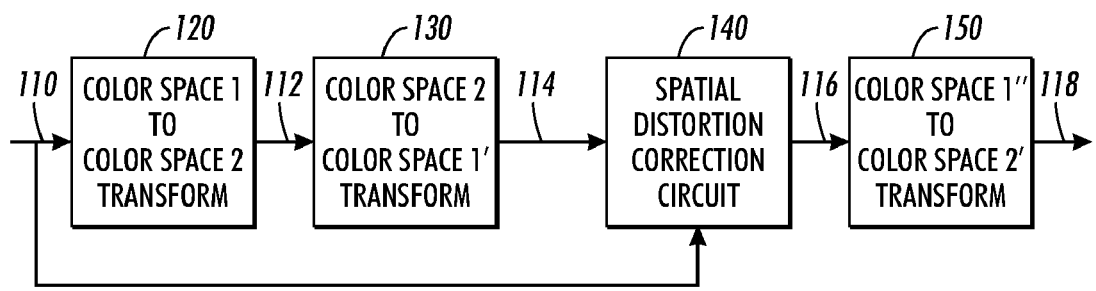
FIG. 2 illustrates an apparatus for transforming a digital color image from one color space to another.

FIG. 2 illustrates an apparatus for transforming from one color space to another color space that preserves important detail that might otherwise be lost due to a conventional mapping (i.e. clipping) between the effective gamuts of the two color spaces involved.

As illustrated, the apparatus of FIG. 2 is composed of individual circuit elements; however, alternatively, the apparatus of FIG. 2 may be implemented as a single large scale circuit element, such as a FPGA or ASIC. Moreover, the apparatus of FIG. 2 may be implemented as a combination of circuit elements and software-controlled general purpose processing elements. The choices of implementation will depend on the design constraints of the particular device of which the apparatus is part.

As illustrated in FIG. 2, an image 110 is input to a color space transforming element 120. Color space transforming element 120 may be implemented as a set of lookup tables or alternatively as a device to perform a set of functional (e.g. matrix) transforms on the input data. The second color space is one in which the desired image processing operations are to take place.

It is noted that in the process of transforming from the first color space to the second it is possible that the transformed pixels are outside the valid encoding range of the second color space. More specifically, although the transformed colors may have a mathematical representation in the color space, the transformed colors do not represent colors that are actually encodable. A simple example of this would be a color in the L*a*b* color space with a negative L* value. In an 8-bit RGB color space, a non-encodable color would have RGB values that were either negative or greater than 255.

Although in the process of transforming from the first color space to the second it is possible that the transformed pixels are non-encodable, color space transforming element 120 transforms the colors in such a way that any pixels that are non-encodable are modified to be substantially within the encoding range of the color space. By "substantially within," the transformation results in color information for each pixel that is not significantly outside of the encodable range of the transformed color space.

One example of such a transformation would be to clip all out of gamut transformed values so that the clipped transformed values lie within the encoding limits of the color space. More specifically, for example, if the transformation to an L*a*b* color space resulted in a negative L* value, the negative L* value would be clipped to 0.

An example of a transformation producing a transformed color space value "substantially within" the targeted color space would to modify any transformed values, which are outside an error range of the gamut boundary, so that the modified transformed values lie within a predetermined amount of the gamut of the color space.

More specifically, for example, if the transformation to an L*a*b* color space resulted in a "−10" L* value and the predetermined error range is a value of 3, the "−10" L* value could be modified to a "−3" L* value.

The transformed image, 112, is then transformed back to the original color space by a second color space transforming element 130, preserving all values as substantially within the encodable part of the color space. The second color space transforming element 130 generates a twice transformed image 114.

Since color space transforms are generally reversible, those pixels in the original image that have encodable values in the second color space would be unaltered by the two transformations. However those pixels that would have had non-encodable values, based upon the transformation by color space transforming element 120, now have different values after the transform back to the original color space by second color space transforming element 130.

As illustrated in FIG. 2, a spatial distortion correction circuit 140 utilizes the original image 110 and the twice transformed image 114 to correct distortions that result from the differences between the twice transformed image 114 and the original image 110.

The spatial distortion correction circuit 140 may modify each twice transformed pixel in image 114 based on any difference between the transformed pixel in image 114 and the corresponding pixel in the original image 110. The spatial distortion correction circuit 140 may also modify based on the values of the pixels in its surrounding neighborhood.

The spatial distortion correction circuit 140 may minimize the deleterious effects of any differences or enhance any desired differences. For example, the spatial distortion correction circuit 140 may be a low pass filter to remove any sharp artifacts. Alternatively the spatial distortion correction circuit 140 may be a high pass filter to preserve or enhance the effects of rapid color shifts in the image that have been lost due to the two transformations 120 and 130.

As illustrated in FIG. 2, the spatial distortion corrected image 116 is transformed by a third color space transforming element 150 using the same transform as the color space transforming element 120, thereby producing the final transformed image 118.

The final image, 118, can be significantly different from the image that would have been generated by simply applying the transform of the color space transforming element 120 or the third transform of the color space transforming element 150. In particular, those pixels which would have resulted in a non-encodable value in the second color space have been modified in such a way that the pixels are now physically encodable and the overall image quality has been improved.

Figure 3:
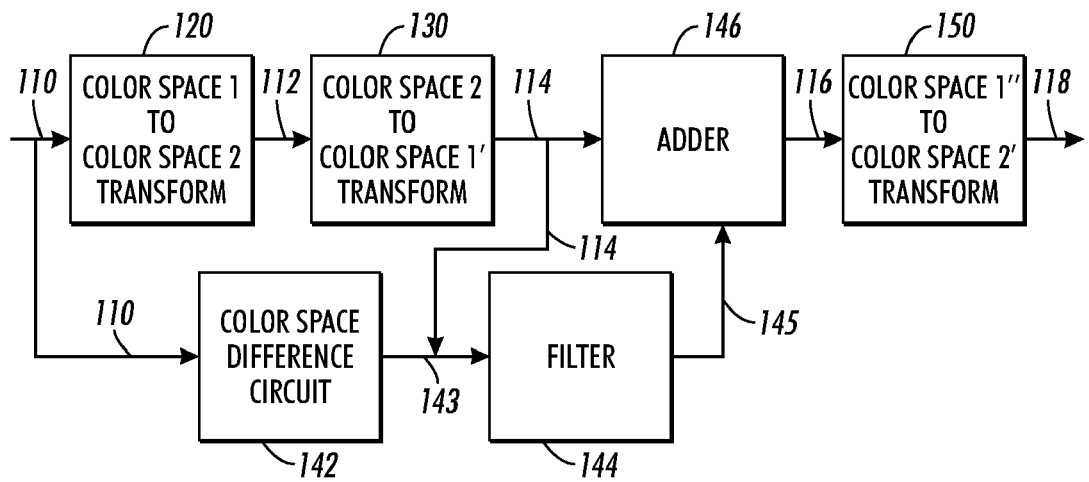
FIG. 3 shows an enhanced version of the apparatus of FIG. 2.

FIG. 3 shows a specific implementation of the apparatus shown in FIG. 2.

In FIG. 3, an original image 110 is input to a color space transforming element 120. Color space transforming element 120 may be implemented as a set of lookup tables or alternatively as a device to perform a set of functional (e.g. matrix) transforms on the input data. The second color space is one in which the image is to be ultimately retained for storing or further processing.

The transformed image, 112, is then transformed back to the original color space by a second color space transforming element 130, preserving all values as substantially within the physically encodable part of the color space. The second color space transforming element 130 generates a twice transformed image 114.

Since color space transforms are generally reversible, those pixels in the original image that have encodable values in the second color space would be unaltered by the two transformations. However those pixels that would have had non-encodable values, based upon the transformation by color space transforming element 120, now have different values after the transform back to the original color space by second color space transforming element 130.

As illustrated in FIG. 3, a color space difference circuit 142 determines a difference between the twice transformed image 114 and the original image 110. The difference image 143 represents where, within the image, a difference exists between the image in the original color space (110) and the image in the twice-transformed color space (114).

As illustrated in FIG. 3, the difference image is passed through a filter 144 that filters the difference image to emphasize those features of the difference whose absence degrades image quality, or whose presence can enhance image quality. An alternative implementation could de-emphasize those features of the difference image that reduce image quality.

Filter 144 may be a spatial filter which applies a filter kernel in a neighborhood around each pixel rather than on a single pixel. The filtered difference image 145 is added back to the twice transformed image 114 in adder 146 to produce an adjusted image 116. The adjusted image is transformed by a third color space transforming element 150 into the final, desired, color space producing a final image 118.

The final image, 118, can be significantly different from the image that would have been generated by simply applying the transform of the color space transforming element 120 or the third transform of the color space transforming element 150. In particular, those pixels which would have resulted in a non-encodable value in the second color space have been modified in such a way that the pixels are now physically encodable and the overall image quality has been improved. More specifically, the final image 118 is in the desired color space, but because those areas of the image that would otherwise have been distorted due to the limits of the color space gamut have been filtered and adjusted to minimize the deleterious effects of the color space gamut mismatch.

Figure 4:
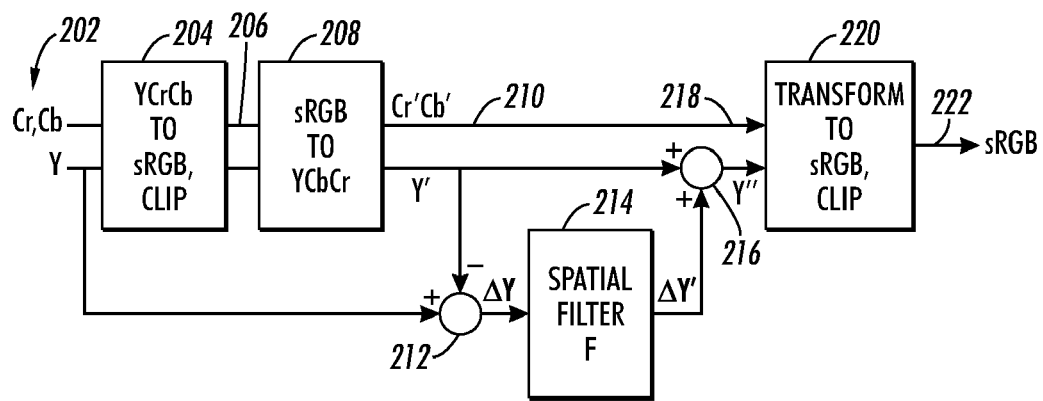
FIG. 4 shows a specific implementation of an apparatus for transforming a digital color image from one color space to another.

FIG. 4 shows another implementation of transforming from one color space to another color space. The input image 202 is encoded in the YCbCr color space input to a color transformation element 204. The color transformation element 204 transforms the image data from the YCbCr color space to the sRGB color space.

The transformation includes clipping any transformed sRGB colors that are outside of the valid encoding to within the valid encoding.

The transformed and clipped image 206, which is now in sRGB color space, is transformed by second color transformation element 208 back to the original YCbCr color space producing image 210. However, any pixels that were clipped by the color transformation element 204 will not be transformed back into their original YCbCr values. In difference element 212, the transformed YCbCr image 210 is subtracted from the original image 202.

For illustrative purposes only, the Y or luminance component is subtracted. It is noted that it is also possible to compare all three components or only the chrominance components.

The difference image $\Delta Y$ is passed through a spatial filter 214. Spatial filter 214 may be designed to enhance those components of the image that are most important. For example, if it is important to preserve high frequency detail to retain sharpness of the image, the spatial filter 214 could be a high pass filter. Other more complex filters may be used, but a simple high pass filter helps in preserving edges and texture, and hence image clarity. Also, spatial filter 214 may be designed to de-emphasize those components of the image that are not desirable.

The output of the spatial filter 214 is added back to the twice transformed image 210 in adder 216, producing a modified image 218 that has had the details that might have otherwise been lost in the simple color space transform and clipping process. Image 218 is transformed by a third color transformation element 220 to the final color space, producing a final image 222.

It is noted that the color transform circuits of FIGS. 2-4 can be implemented as matrix multiplication elements. It is noted that the matrix multiplication elements can be arranged so that the matrix elements are all related, to within a simple scale factor, as numbers of the form $2^n$. Making the elements of the form $2^n$ allows for a simple implementation since multiplication by $2^n$ can be implemented as shift operations rather than direct multiplication.

Figure 5:
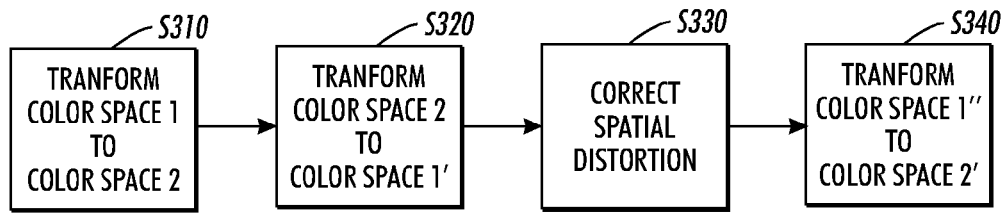
FIG. 5 shows a method for transforming a digital color image from one color space to another.

A flowchart showing the process for converting an image in one color space to another color space is shown in FIG. 5. At step S310, the input image is transformed from a first color space to a second color space. In the transformation process, it is understood that any non-encodable colors, which are color values that are mathematically allowed but not physically encodable, are adjusted so that the transformed color values lie substantially within the gamut of the transformed color space.

At step S320, the transformed image is converted back to the original color space, again ensuring that any non-encodable colors are modified so that the transformed color values lie substantially within the allowed color space gamut.

At step S330, distortions, which are differences, between the original image and the twice transformed image, are corrected. This corrected image is transformed again at step S340 to the final desired color space.

The correction can be done in such a way that desired features of the image are preserved while undesired features are reduced or eliminated.

For example, the correction may apply a high pass filter to ensure that edges defined by sharp shifts in color are preserved. The distortion correction in step S330 may also be done by considering the distortions in the neighborhood around each pixel or on a pixel by pixel basis.

Figure 6:
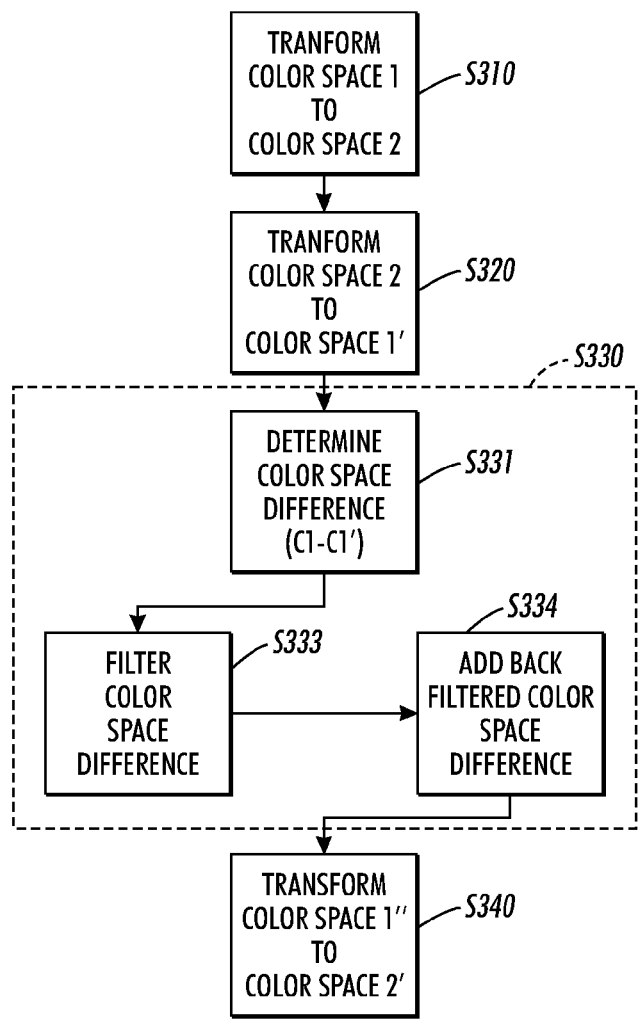
FIG. 6 shows an enhanced method for transforming a digital color image from one color space to another.

An example of the distortion correction is shown in more detail in FIG. 6. In FIG. 6, step S330 is represented by the dashed outline.

As illustrated in FIG. 6, at step S332, a difference image is computed, on a pixel by pixel basis, by subtracting the twice transformed image that is output at step S320 from the original image. At step S333, the difference image is filtered. In one embodiment, the difference image may be spatially filtered.

The filtering may consider the pixel values in a neighborhood around each pixel when applying the filter. The filtering may emphasize desired features and/or de-emphasize or eliminate undesired features.

For example, if it is desirable to retain sharp edges where there are abrupt changes in color, a high pass filtering may be applied to the difference image resulting in a filtered output that particularly retains those areas of the image with sharp color transitions. It is understood that high pass filtering in this context is a generic term including generalized high pass filters, non-linear and/or conditional high pass filter processing, stochastic and order-statistic high pass filters, etc. Also, the high pass filter might change either structure or support based on local color image data.

At step S334, the filtered difference image is added back to the twice transformed original image that is the output of step S320. This combined image is transformed again at step S340 to the final desired color space.

Since the filtered difference image is added at step S334, the resulting image will have improved values in those areas of the image where the desired features lie.

If, for example, a high pass filter is applied at step S333, the areas of the image with sharp color transitions will have a sharper transition, after step S340 than the areas of the image with sharp color transitions would have had if the transformation had been done without the extra processing steps.

In summary, a method converts an original digital image being represented by a first color space to a digital image being represented by a second color space by transforming the original image data represented by a first color space to second image data being represented by a second color space, the transformation causing the colors of the transformed image data to be substantially encodable in the second color space; transforming the second image data represented by the second color space to third image data represented by the first color space, the transformation causing the colors of the transformed image data to be substantially encodable; correcting distortions in the third image data represented by the first color space to form corrected image data represented by the first color space; and transforming the corrected image data represented by the first color space to fourth image data represented by the second color space.

The color spaces may be luminance-chrominance or device-dependent color spaces. Moreover, the corrections of the distortions in the third image data represented by the first color space to form corrected image data represented by the first color space may be realized by subtracting the third image data represented by the first color space from the original image data represented by the first color space to form difference image data represented by the first color space; spatially filtering the difference image data to form spatially filtered image data; and adding the spatially filtered difference image data to the third image data represented by the first color space.

The spatial filtering may be high pass filtering. The difference image may be generated from only a luminance component of the color space, generated from only the chrominance components of the color space, and/or both the luminance and chrominance components of the color space.

The color transformations may be implemented as simple matrix transformations. The elements of the simple matrix transformations may be all powers of 2.

An apparatus for performing color space transformations of a color digital image includes a first transforming circuit to transform an original image from a first color space to a second color space, the first transforming circuit causing the transformed image to be substantially within a proper encodable gamut of the second color space; a second transforming circuit, operatively connected to the first transforming circuit, to convert the image from the second color space back to the first color space producing a second transformed image represented by the first color space, the second transforming circuit causing the transformed image to be substantially within a proper encodable gamut of the first color space; a correction circuit, operatively connected to the second transforming circuit, to receive the second transformed image and the original image.

The correction circuit corrects distortions in the second transformed image to form a corrected image represented by the first color space. A third transforming circuit is operatively connected to the correction circuit and the second transforming circuit to transform the corrected image represented by the first color space to the second color space, thereby producing a final transformed image.

The color spaces may be luminance-chrominance or device-dependent spaces. Moreover, the correction circuit may include a subtraction circuit to subtract the original image from the second transformed image to form a difference image; a filter to spatial filter the difference image; and a summing circuit to add the spatially filtered difference image and the second transformed image.

The spatial filtering may be high pass filtering. The difference image may be generated from only a luminance component of the color space, generated from only the chrominance components of the color space, and/or both the luminance and chrominance components of the color space.

The color transformations may be implemented as simple matrix transformations. The elements of the simple matrix transformations may be all powers of 2.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for converting an original digital image being represented by a first color space to a digital image being represented by a second color space, comprising:
    (a) transforming the original image data represented by a first color space to second image data being represented by a second color space, the transformation causing the colors of the transformed image data to be substantially encodable in the second color space;
    (b) transforming the second image data represented by the second color space to third image data represented by the first color space, the transformation causing the colors of the transformed image data to be substantially encodable in the first color space;
    (c) correcting distortions in the third image data represented by the first color space to form corrected image data represented by the first color space; and
    (d) transforming the corrected image data represented by the first color space to fourth image data represented by the second color space.

2. The method as claimed in claim 1, wherein the first color space is a luminance-chrominance space, and the second color space is an RGB space.

3. The method as claimed in claim 1, wherein correcting distortions in the third image data represented by the first color space to form corrected image data represented by the first color space comprises:
    (e) subtracting the third image data represented by the first color space from the original image data represented by the first color space to form difference image data represented by the first color space;
    (f) spatially filtering the difference image data to form spatially filtered image data; and
    (g) adding the spatially filtered difference image data to the third image data represented by the first color space.

4. The method as claimed in claim 3, wherein the spatial filtering is detail preserving.

5. The method as claimed in claim 4, wherein the detail preserving filtering is high pass filtering.

6. The method as claimed in claim 3, wherein the first color space is a luminance-chrominance space.

7. The method as claimed in claim 6, wherein the difference image is generated from only a luminance component of the color space.

8. The method as claimed in claim 6, wherein the difference image is generated from only the chrominance components of the color space.

9. The method as claimed in claim 1, wherein the color transformations are implemented as simple matrix transformations.

10. The method as claimed in claim 9, wherein the elements of the simple matrix transformations are all powers of 2.

11. An apparatus for performing color space transformations of a color digital image comprising:

a first transforming circuit to transform an original image from a first color space to a second color space, said first transforming circuit causing the transformed image to be substantially within a proper encodable gamut of the second color space;

a second transforming circuit, operatively connected to said first transforming circuit, to convert the image from the second color space back to the first color space producing a second transformed image represented by the first color space, said second transforming circuit causing the transformed image to be substantially within a proper encodable gamut of the first color space;

a correction circuit, operatively connected to said second transforming circuit, to receive the second transformed image and the original image, said correction circuit correcting distortions in the second transformed image to form a corrected image represented by the first color space; and a third transforming circuit, operatively connected to said correction circuit and said second transforming circuit, to transform the corrected image represented by the first color space to the second color space, thereby producing a final transformed image.

12. The apparatus as claimed in claim 11, wherein said corrections circuit comprises:

a subtraction circuit to subtract the original image from the second transformed image to form a difference image;

a filter to spatially filter the difference image; and a summing circuit to add the spatially filtered difference image and the second transformed image.

13. The apparatus as claimed in claim 12, wherein the three transforming circuits are matrix multipliers.

14. The apparatus as claimed in claim 13, wherein all matrix elements are made to be scaled as powers of 2.

15. The apparatus as claimed in claim 12, wherein said spatial filtering is detail preserving.

16. The apparatus as claimed in claim 15, wherein said detail preserving filtering is high pass filtering.

17. The apparatus as claimed in claim 12, wherein all color spaces are luminance-chrominance color spaces.

18. The apparatus as claimed in claim 17, wherein said correction circuit only corrects distortions in the luminance components of the image.

19. The apparatus as claimed in claim 17, wherein said correction circuit only corrects distortions in the chrominance components of the image.

20. The apparatus as claimed in claim 11, wherein the first color space is a luminance-chrominance color space.

21. The apparatus as claimed in claim 20, wherein said correction circuit only corrects distortions in the luminance components of the image.

22. The apparatus as claimed in claim 20, wherein said correction circuit only corrects distortions in the chrominance components of the image.

* * * * *